(12) United States Patent
Zimmer et al.

(10) Patent No.: US 9,534,712 B2
(45) Date of Patent: Jan. 3, 2017

(54) MULTI-LAYERED FUEL FEED PIPE

(71) Applicant: TI Automotive (Fuldabrüch) GmbH, Fuldabrüch (DE)

(72) Inventors: Werner Zimmer, Melsungen/Röhrenfurth (DE); Frank Fahrenholz, Kassel (DE); Andreas Szczepaniak, Lohfelden (DE); Matthias Baumann, Schauenburg-Breitenbach (DE)

(73) Assignee: TI Automotive (Fuldabrück) GmbH, Fuldabrück (DE)

( * ) Notice: Subject to any disclaimer, the term of this patent is extended or adjusted under 35 U.S.C. 154(b) by 0 days.

(21) Appl. No.: 14/191,842

(22) Filed: Feb. 27, 2014

(65) Prior Publication Data
US 2014/0246111 A1    Sep. 4, 2014

(30) Foreign Application Priority Data

Mar. 1, 2013  (EP) .................................. 13157360

(51) Int. Cl.
| | |
|---|---|
| F16L 11/00 | (2006.01) |
| F16L 9/14 | (2006.01) |
| B32B 27/30 | (2006.01) |
| B32B 27/34 | (2006.01) |
| B32B 1/08 | (2006.01) |
| F16L 11/04 | (2006.01) |

(Continued)

(52) U.S. Cl.
CPC . *F16L 9/14* (2013.01); *B32B 1/08* (2013.01); *B32B 27/306* (2013.01); *B32B 27/34* (2013.01); *F16L 9/12* (2013.01); *F16L 9/125* (2013.01); *F16L 11/045* (2013.01); *F16L 11/127* (2013.01); *B32B 2250/05* (2013.01); *B32B 2250/24* (2013.01); *B32B 2307/7265* (2013.01); *B32B 2597/00* (2013.01); *F16L 2011/047* (2013.01)

(58) Field of Classification Search
CPC ............ F16L 9/12; F16L 9/125; F16L 11/045; F16L 11/047
USPC ............................... 138/137, 141; 428/36.91
See application file for complete search history.

(56) References Cited

U.S. PATENT DOCUMENTS

| | | | | |
|---|---|---|---|---|
| 5,076,329 A | * | 12/1991 | Brunnhofer .................... | 138/137 |
| 5,383,087 A | * | 1/1995 | Noone et al. .................. | 361/215 |
| 6,089,278 A | * | 7/2000 | Nishino et al. ............... | 138/137 |

(Continued)

FOREIGN PATENT DOCUMENTS

EP    1 182 345 A1    2/2002

OTHER PUBLICATIONS

European Patent Office, European Search Report in European Patent Application No. 13 15 3768 (Aug. 7, 2013).

(Continued)

Primary Examiner — James Hook
(74) Attorney, Agent, or Firm — Brinks Gilson & Lione

(57) ABSTRACT

Multi-layered fuel feed pipe, wherein the feed pipe comprises at least five layers with the following layer structure from the inside to the outside: an innermost layer consisting of at least one polymer from the group "polyamide, fluoropolymer, polyphenylene sulfide, polybutylene naphthalate", a first support layer consisting of polyamide, a barrier layer, a second support layer consisting of polyamide, an outer layer consisting of at least one polymer from the group "polyamide, polyphenylene sulfide, polyphthalamide".

21 Claims, 1 Drawing Sheet

(51) Int. Cl.
*F16L 9/12* (2006.01)
*F16L 11/127* (2006.01)

(56) References Cited

U.S. PATENT DOCUMENTS

| | | | | |
|---|---|---|---|---|
| 6,127,478 | A * | 10/2000 | Spohn | C08L 67/02 525/66 |
| 6,170,535 | B1 * | 1/2001 | Sadr et al. | 138/137 |
| 6,491,994 | B1 * | 12/2002 | Kito | B32B 1/08 428/36.5 |
| 6,576,312 | B1 * | 6/2003 | Ito | F16L 11/127 138/137 |
| 6,823,898 | B1 * | 11/2004 | Nie et al. | 138/137 |
| 8,097,316 | B2 * | 1/2012 | Sato | 428/35.7 |
| 2002/0033197 | A1 * | 3/2002 | Zimmer et al. | 138/137 |
| 2003/0035914 | A1 * | 2/2003 | Nishi | B32B 1/08 428/36.91 |
| 2003/0124288 | A1 | 7/2003 | Merziger | |
| 2003/0226608 | A1 * | 12/2003 | Ainsworth | 138/137 |
| 2004/0146679 | A1 * | 7/2004 | Suzuki | B32B 1/08 428/36.91 |
| 2006/0127621 | A1 * | 6/2006 | Sato | B32B 1/08 428/36.91 |
| 2006/0236979 | A1 * | 10/2006 | Stolarz et al. | 123/468 |
| 2007/0148389 | A1 * | 6/2007 | Nishioka et al. | 428/36.91 |
| 2008/0014397 | A1 * | 1/2008 | Manai et al. | 428/36.9 |
| 2009/0026282 | A1 * | 1/2009 | Bonnet et al. | 237/69 |
| 2009/0288728 | A1 * | 11/2009 | Sumi et al. | 138/137 |
| 2009/0297749 | A1 * | 12/2009 | Sato | 428/36.7 |

OTHER PUBLICATIONS

European Patent Office, European Search Report in European Patent Application No. 13 15 7360 (Jul. 1, 2013).
European Patent Office, cf Form 1507 in European Patent Application No. 13 15 7360.2.

* cited by examiner

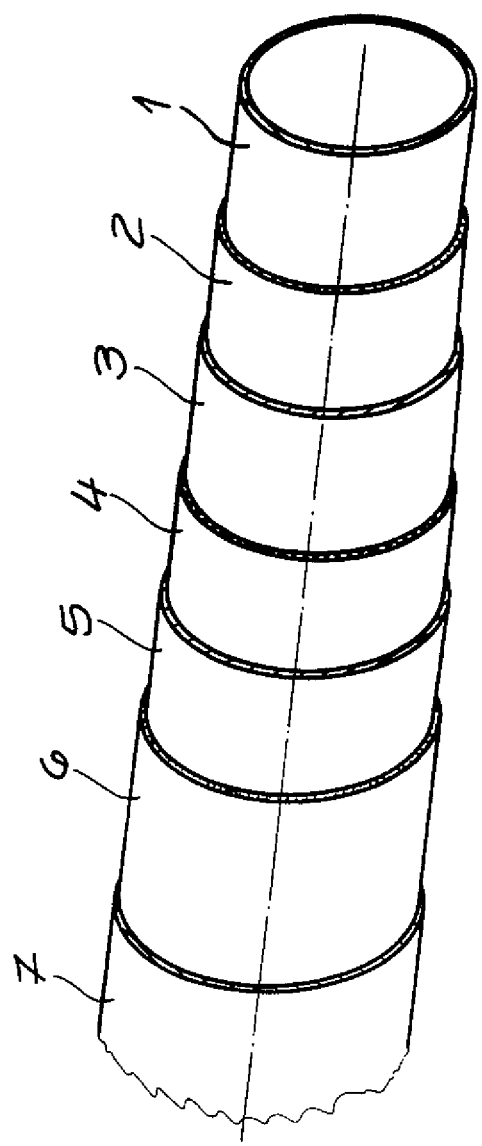

MULTI-LAYERED FUEL FEED PIPE

CROSS REFERENCE TO RELATED APPLICATIONS

This patent application claims priority pursuant to Title 35 USC Section 119 to European Patent Application No. 13 157 360.2, filed Mar. 1, 2013, the entire contents of which are hereby incorporated by reference herein.

BACKGROUND

The invention relates to a multi-layered fuel feed pipe, wherein the feed pipe comprises at least five layers. In particular, the invention-based multi-layered fuel feed pipe is used in motor vehicles.

Multi-layered fuel feed pipes of the type mentioned above are generally known in different designs. Such fuel feed pipes—especially those used in motor vehicles—have to fulfill different requirements. For example, in the event of a crash, the fuel feed pipes must have sufficient mechanical resistance. Furthermore, the fuel feed pipes have to be sufficiently resistant toward chemical stresses that would result from components contained in the fuel. For example, it would be desirable for the fuel feed pipes to feature low permeability to alcohols, especially methanol and/or ethanol, contained in the fuel. Furthermore, the fuel feed pipes should have excellent temperature stability. However, many of the currently known fuel feed pipes cannot completely fulfill these requirements. Therefore, there is a need for improvement.

The invention is based on the technical problem of providing a multi-layered fuel feed pipe of the type mentioned above which avoids or at least minimizes the above-mentioned disadvantages.

SUMMARY OF THE INVENTION

To solve this technical problem, the invention proposes a multi-layered fuel feed pipe, wherein the fuel feed pipe comprises at least five layers with the following layer structure from the inside to the outside:
  an innermost layer consisting of at least one polymer from the group "polyamide, fluoropolymer, polyphenylene sulfide, polybutylene naphthalate",
  a first support layer consisting of polyamide,
  a barrier layer,
  a second support layer consisting of polyamide,
  an outer layer consisting of at least one polymer from the group "polyamide, polyphenylene sulfide, polyphthalamide".

It is part of the invention that the innermost layer is in contact with the fuel flowing through the fuel feed pipe.

According to one embodiment of the invention, the innermost layer is designed to be electrically conductive. For this purpose, generally known conductivity additives, such as conductive carbon black or graphite fibers, are added to the plastic material of the innermost layer. According to one embodiment, the innermost layer consists of polyamide 9 T, wherein it is practical to design the innermost layer consisting of said polyamide to be conductive. According to a different embodiment of the invention, the innermost layer consists of at least one fluoropolymer from the group "ethylene-tetrafluoroethylene (ETFE), EFEP fluoropolymer, THV". The EFEP fluoropolymer involves a copolymer consisting of ethylene, tetrafluoroethylene and hexafluoropropylene. THV is a terpolymer consisting of tetrafluoroethylene, hexafluoroethylene and vinylidene fluoride. The invention also includes that the innermost layer functions as a barrier layer, especially against alcohols, such as methanol and/or ethanol. Furthermore, the invention involves that the innermost layer is free of oligomeres. Oligomeres can be dissolved in most fuels and can damage the motor of a motor vehicle or other components of the motor vehicle. According to one embodiment, the innermost layer can be welded.

It is preferred that the thickness of the innermost layer ranges between 0.1 and 0.3 mm, preferably between 0.15 and 0.25 mm. According to a preferred embodiment, the thickness of the innermost layer amounts to 0.2 mm or approximately 0.2 mm.

It is suggested that the first support layer consists of, or primarily consists of, polyamide 6. One embodiment of the invention is characterized in that an adhesive layer has been arranged between the innermost layer and the first support layer. The adhesive layer improves or optimizes the adhesion between the innermost layer and the first support layer. It is practical when the adhesive layer basically consists of, or primarily consists of, a blend of polyamide, or polyamide 6, and the plastic material of the innermost layer.

According to an especially preferred embodiment of the invention, the first support layer is directly, and without interposition of an additional layer, connected with the barrier layer. The invention involves that the barrier layer consists of, or primarily consists of, ethylene vinyl alcohol copolymer (EVOH).

Preferably, the second support layer consists of, or primarily consists of, polyamide 6 (PAG). It is suggested that the second support layer is directly, and without interposition of an additional layer, connected with the barrier layer.

An especially preferred embodiment of the invention is characterized in that the layer unit consisting of the first support layer, the barrier layer and the second support layer has a thickness of between 0.5 and 0.8 mm, preferably between 0.6 and 0.7 mm. Subsequently, this layer unit is also described as core unit.

It is suggested that the first support layer has a layer thickness of between 0.15 and 0.35 mm, preferably between 0.2 and 0.3 mm. Preferably, the second support layer has a thickness of between 0.15 and 0.35 mm, preferably between 0.2 and 0.3 mm.

It is practical when the layer thickness of the barrier layer ranges between 0.1 and 0.2 mm, preferably between 0.12 and 0.18 mm. The invention involves that the layer thickness of the barrier layer is lower than the layer thickness of the first support layer and/or lower than the layer thickness of the second support layer. The barrier layer, in particular the barrier layer consisting of EVOH, functions especially as support layer or barrier layer against alcohols, in particular against methanol and ethanol.

The invention involves that an adhesive layer has been arranged between the second support layer and the outer layer. As described above, such an adhesive layer serves the purpose of improving or optimizing the adhesion between the second support layer and the outer layer. It is practical when the adhesive layer between the second layer and the outer layer consists of, or primarily consists of, a blend of polyamide or polyamide 6 and the plastic material of the outer layer.

It is suggested that the layer thickness of the outer layer ranges between 0.1 and 0.3 mm, preferably between 0.15 and 0.25 mm. An especially preferred embodiment is characterized in that the layer thickness of the outer layer amounts to 0.2 mm or approximately 0.2 mm. According to one embodiment of the invention, the outer layer consists of at least one polyamide, especially a polyamide from the group "polyamide 12, polyamide 11, polyamide 1010, polyamide 1012, polyamide 1212, polyamide 610, polyamide 612".

The invention involves that the outer layer can be welded, especially within a spin welding process or a laser welding process. Furthermore, the invention involves that the outer layer ensures the mechanical resistance, or primary mechanical resistance, of the invention-based multi-layered fuel feed pipe of a motor vehicle. According to one embodiment of the invention, at least one dye is added to the plastic material of the outer layer. In this way, it is possible to design the outer layer in different colors, as required.

The invention is based on the knowledge that the invention-based multi-layered fuel feed pipe has a plurality of advantages in comparison to currently known fuel feed pipes. For example, the invention-based fuel feed pipe is characterized in that it is sufficiently resistant against the components contained in fuels. In particular, it features low permeability to alcohols, especially methanol and/or ethanol. The invention-based fuel feed pipe is also characterized by excellent mechanical resistance, especially in the event of a motor vehicle crash. Moreover, the invention-based fuel feed pipe is sufficiently resistant against higher temperatures. It should be particularly emphasized that the invention-based fuel feed pipe can be implemented with little effort, especially at a low cost. In comparison to currently known fuel feed pipes, an expert could not have anticipated these advantages.

Subsequently, the invention is explained in more detail by means of a drawing representing one embodiment. The FIGURE shows an invention-based multi-layered fuel feed pipe of a motor vehicle.

DESCRIPTION OF THE DRAWINGS

FIG. 1 shows a 7-layered invention-based fuel feed pipe.

DETAILED DESCRIPTION OF ILLUSTRATED EMBODIMENT

In the embodiment of FIG. 1, the innermost layer 1 consists of ethylene-tetrafluoroethylene (ETFE). It is designed to be electrically conductive, for example, with an addition of conductive carbon black, graphite fibers or the like. In the embodiment, a first adhesive layer 2 is added to the innermost layer 1. A first support layer consisting of polyamide 6 (PA 6) is connected with the first adhesive layer 2. Toward the outside, a barrier layer 4 consisting of ethylene vinyl alcohol copolymer (EVOH) is directly, and without interposition of an additional layer, added to the first support layer 3. A second support layer 5 consisting of polyamide 6 (PA 6) is also directly, and without interposition of an additional layer, connected with the barrier layer 4. In the embodiment, toward the outside, a second adhesive layer 6 is added to the second support layer 5. In the embodiment, toward the outside, the second adhesive layer 6 is connected with an outer layer 7 consisting of polyamide. Practically, the polyamide involves a polyamide from the group "polyamide 12, polyamide 11, polyamide 1010, polyamide 1012, polyamide 1212, polyamide 610, polyamide 612". The layer unit or core unit from the first support layer 3, the barrier layer and the second support layer 5 in combination with the remaining characteristics of the invention is a critical or important feature of the invention. In the embodiment, and as a matter of practicality, the barrier layer 4 comprises a lower layer thickness than the first support layer 3 from PA 6 and the second support layer 5 from PA 6.

Variations and modifications of the foregoing are within the scope of the present invention. It is understood that the invention disclosed and defined herein extends to all alternative combinations of two or more of the individual features mentioned or evident from the text and/or drawings. All of these different combinations constitute various alternative aspects of the present invention. The claims are to be construed to include alternative embodiments to the extent permitted by the prior art.

The invention claimed is:

1. Multi-layered fuel feed pipe, wherein the feed pipe comprises at least five layers with the following layer structure from the inside to the outside:
   an innermost layer consisting of at least one polymer selected from the group of fluoropolymer, polyphenylene sulfide, and polybutylene naphthalate,
   a first support layer consisting of polyamide,
   a barrier layer,
   a second support layer consisting of polyamide, and
   an outer layer consisting of at least one polymer selected from the group of polyamide, polyphenylene sulfide, and polyphthalamide,
   wherein the layer thickness of the barrier layer is lower than the layer thickness of the second support layer,
   wherein the second support layer has a thickness of between 0.15 and 0.35 mm;
   wherein an inner adhesive layer has been arranged between the innermost layer and the first support layer and wherein the inner adhesive layer consists of a blend of the polymer of the first support layer and the polymer of the innermost layer.

2. Fuel feed pipe according to claim 1, wherein the innermost layer is designed to be electrically conductive.

3. Fuel feed pipe according to claim 1, wherein the layer thickness of the innermost layer ranges between 0.1 and 0.3 mm.

4. A multi-layered fuel feed pipe as claimed in 3 wherein the layer thickness of the innermost layer ranges from between 0.15 and 0.25 mm.

5. Fuel feed pipe according to claim 1, wherein the first support layer consists, or primarily consists, of polyamide 6 (PA 6).

6. Fuel feed pipe according to claim 1, wherein the first support layer is directly, and without interposition of an additional layer, connected with the barrier layer.

7. Fuel feed pipe according to claim 1, wherein the barrier layer consists of, or primarily consists of, ethylene vinyl alcohol copolymer (EVOH).

8. Fuel feed pipe according to claim 1, wherein the second support layer consists of, or primarily consists of, polyamide 6 (PA6).

9. Fuel feed pipe according to claim 1, wherein the second support layer is directly, and without interposition of an additional layer, connected with the barrier layer.

10. Fuel feed pipe according to claim 1, wherein the layer unit consisting of the first support layer, the barrier layer and the second support layer has a thickness of between 0.5 and 0.8 mm.

11. Fuel feed pipe according to claim 10 wherein the layer group consisting of the first support layer, the barrier layer and the second support layer has a thickness of between 0.6 and 0.7 mm.

12. Fuel feed pipe according to claim 1, wherein the first support layer has a layer thickness of between 0.15 and 0.35 mm and/or wherein the second support layer has a thickness of between 0.2 and 0.3 mm.

13. Fuel feed pipe according to claim 12, wherein the first support layer has a layer thickness of between 0.2 and 0.3 mm.

14. Fuel feed pipe according to claim 1, wherein the layer thickness of the barrier layer ranges between 0.1 and 0.2 mm.

15. Fuel feed pipe according to claim 14 wherein the layer thickness of the barrier layer ranges between 0.12 and 0.18 mm.

16. Fuel feed pipe according to claim 1, wherein the layer thickness of the barrier layer is lower than the layer thickness of the first support layer.

17. Fuel feed pipe according to claim 1, wherein a second adhesive layer has been arranged between the second support layer and the outer layer.

18. Fuel feed pipe according to claim 1, wherein the thickness of the outer layer ranges between 0.1 and 0.3 mm.

19. Fuel feed pipe according to claim 18 wherein the thickness of the outer layer ranges between 0.15 and 0.25 mm.

20. Fuel feed pipe according to claim 1, wherein the outer layer consists of at least one polyamide, especially a polyamide from the group "polyamide 12, polyamide 11, polyamide 1010, polyamide 1012, polyamide 1212, polyamide 610, polyamide 612".

21. Fuel feed pipe according to claim 1, wherein the innermost layer and/or the outer layer can be welded.

* * * * *